(12) United States Patent
Hu et al.

(10) Patent No.: US 11,958,365 B2
(45) Date of Patent: Apr. 16, 2024

(54) METHOD FOR DUAL-MOTOR CONTROL ON ELECTRIC VEHICLE BASED ON ADAPTIVE DYNAMIC PROGRAMMING

(71) Applicant: Jiangxi University of Science and Technology, Ganzhou (CN)

(72) Inventors: Hailin Hu, Ganzhou (CN); Fu Feng, Ganzhou (CN); Chen Chen, Ganzhou (CN); Yue Zhang, Jiangxi (CN); Wen Li, Ganzhou (CN); Heng Shi, Ganzhou (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 668 days.

(21) Appl. No.: 17/115,963

(22) Filed: Dec. 9, 2020

(65) Prior Publication Data
US 2021/0170883 A1 Jun. 10, 2021

(30) Foreign Application Priority Data
Dec. 9, 2019 (CN) .......................... 201911247511.2

(51) Int. Cl.
*B60L 15/20* (2006.01)
*B60K 1/02* (2006.01)
*G06N 20/00* (2019.01)

(52) U.S. Cl.
CPC ............ *B60L 15/2045* (2013.01); *B60K 1/02* (2013.01); *G06N 20/00* (2019.01);
(Continued)

(58) Field of Classification Search
CPC ........... B60L 15/2045; B60L 2240/421; B60L 2240/423; B60L 2240/427;
(Continued)

(56) References Cited

U.S. PATENT DOCUMENTS

2014/0018988 A1* 1/2014 Kitano ................ B60L 15/2045
701/22

FOREIGN PATENT DOCUMENTS

CN 110001414 A 7/2019
CN 110406526 A * 11/2019

OTHER PUBLICATIONS

English translation of CN-110406526-A (Year: 2019).*
Chinese Office Action for CN 201911247511.2; dated Nov. 3, 2020; 8 pages.

* cited by examiner

*Primary Examiner* — Shon G Foley
(74) *Attorney, Agent, or Firm* — Barclay Damon LLP (57) ABSTRACT

The present disclosure discloses a method for dual-motor control on an electric vehicle based on adaptive dynamic programming. First, total torque required is calculated based on obtained data information of the electric vehicle under various driving conditions, and offline training is conducted on an execution network and an evaluation network. Then total torque is dynamically distributed for two motors of the electric vehicle under various driving conditions to obtain an efficiency MAP database. Afterwards, iteration and online learning are conducted on the execution network and the evaluation network based on data information of the electric vehicle under different driving conditions that is obtained in real time, so as to find an optimal control law for the electric vehicle under a real-time driving condition. In this way, the dual-motor control on the electric vehicle is optimized.

7 Claims, 4 Drawing Sheets

(52) U.S. Cl.
CPC ... *B60L 2240/421* (2013.01); *B60L 2240/423* (2013.01); *B60L 2240/427* (2013.01); *B60L 2240/429* (2013.01); *B60L 2240/70* (2013.01); *B60L 2250/26* (2013.01); *B60L 2260/42* (2013.01); *B60L 2260/46* (2013.01)

(58) Field of Classification Search
CPC .......... B60L 2240/429; B60L 2240/70; B60L 2250/26; B60L 2260/42; B60L 2260/46; B60L 2220/42; B60L 15/38; B60K 1/02; G06N 20/00; G06N 3/084; G06N 3/044; G06N 3/045; Y02T 10/64; Y02T 10/72; Y02T 90/16; B60W 50/00; B60W 2050/0019; B60W 2710/083
See application file for complete search history.

METHOD FOR DUAL-MOTOR CONTROL ON ELECTRIC VEHICLE BASED ON ADAPTIVE DYNAMIC PROGRAMMING

CROSS REFERENCE TO RELATED APPLICATION

This application claims priority of Chinese Patent Application No. 201911247511.2, filed on Dec. 9, 2019, under applicable portions of 35 U.S.C. § 119. The entire content of the priority application is incorporated herein by reference in their entirety.

TECHNICAL FIELD

The present disclosure relates to the technical field of motor drive for electric vehicles, and in particular, to a method for dual-motor control on an electric vehicle based on adaptive dynamic programming.

BACKGROUND

At present, drive structures of pure electric vehicles can be classified into centralized drives and distributed drives. On centralized-drive electric vehicles, drive motors are used to provide total power, and the power is transmitted to wheels through drive shafts, reducers, and differentials. This drive structure is similar to a drive structure of a conventional vehicle with relatively mature technologies and wide application, such as an integrated motor power transmission type, a single-motor direct drive type, and a dual-motor coupling drive type. However, for a single-motor direct drive, there are high requirements on torque performance parameters of a motor system, leading to high motor costs.

A dual-motor drive uses two drive motors. A mechanical device implements total power coupling. Then a transmission shaft, a reducer, etc. implement torque coupling and output. Torque and power are reduced by increasing the number of motors, thereby relaxing requirements for core components such as an insulated gate bipolar transistor (IGBT). A distributed dual-motor drive is a relatively novel type of drive. A vehicle is driven by a wheel or hub motor. A distributed drive system is arranged flexibly, occupies a small space, and has a simple structure without a conventional differential. Electronic differential is implemented through motor control, which delivers better dynamic performance than conventional motor control. However, battery-powered electric buses still have the disadvantages of long charging time, short battery life, etc. Therefore, reducing energy costs and improving energy utilization are very important and necessary for further application of battery-powered electric vehicles. To achieve this objective, it is crucial to determine an optimal and appropriate power management strategy for a multi-motor control system. There are various types of motor drive systems. The efficiency of the drive system, which is a core power component of a vehicle, largely determines the energy consumption level of the whole vehicle. The overall efficiency of the drive system depends on the efficiency characteristics of the component itself on the one hand, and on the control strategy at the system level on the other.

Regarding the power or torque distribution control at the system level, in development and research of most hybrid vehicles in and outside China, methods such as fuzzy control and dynamic programming are used to study motor power distribution. An optimization objective is usually the minimum energy consumption or optimal integrated economy of electronic vehicles. A corresponding control strategy is used to achieve optimal battery life of pure electric vehicles. In addition, attention is paid to the stability of distributed-drive vehicles. When dynamic programming or fuzzy control is conducted to distribute a motor operating mode and torque, the application of the fuzzy control strategy can optimize torque and energy distribution to a certain extent as non-linearity of motor control and operating conditions are increasingly complex. However, operating conditions, load, battery performance, etc. cannot be fully covered during rule formulation for fuzzy control. Therefore, some vulnerabilities are prone to appear. In addition, after the efficiency of system components changes during driving, corresponding rules and parameters cannot be promptly adjusted for the control strategy. A desired control effect cannot be achieved due to system errors accumulating for a long period of time. When dynamic programming is conducted to distribute torque, the "dimensional disaster" problem is inevitable as nonlinear complexity of the system is increasingly high, and the controller cannot run online in real time. In the prior art, usually, only the motor mode of a motor is considered for energy distribution of the multi-motor system, and the engine mode of the motor during braking is rarely considered.

A large number of achievements related to dynamic programming accumulated in practical application in terms of these problems, but dynamic programming has obvious disadvantages. Its backward-in-time algorithm produces a huge amount of calculation. Therefore, the algorithm is suitable only for optimal control of small-scale simple nonlinear systems. Many ideas and specific technical methods for solving nonlinear system optimization problems were proposed with the development and enrichment of reinforcement learning, artificial neural networks, fuzzy systems, evolutionary computing, etc. in the field of artificial intelligence.

In view of this, the research on a method for dual-motor control on an electric vehicle based on adaptive dynamic programming is a technical problem to be solved urgently by a person skilled in the art.

SUMMARY

An objective of the present disclosure is to provide a method for dual-motor control on an electric vehicle based on adaptive dynamic programming. The method aims to optimize dual-motor operating points and dual-motor drive torque distribution by using an adaptive dynamic programming method, so as to resolve a problem of dual-motor torque distribution on the electric vehicle under complex operating conditions. In this way, it is ensured that dual-motor operating points of the electric vehicle under various driving conditions deliver the optimal efficiency. In addition, it is ensured that efficiency output of the dual-motor power system of the electric vehicle under different driving conditions is an optimal control law. This resolves a conflict between power and efficiency of the electric vehicle, and improves power performance and efficiency of the dual-motor system of the electric vehicle.

To achieve the above objective, the present disclosure provides a method for dual-motor control on an electric vehicle based on adaptive dynamic programming, including the following steps:

S1. obtaining, by a controller, data information of the electric vehicle under various driving conditions, and calculating total torque required by two motors of the electric vehicle based on the obtained data information and a corresponding accelerator pedal opening and/or brake pedal opening;

S2. establishing an execution network and an evaluation network for the electric vehicle, conducting offline training based on the data information obtained in S1, and dynamically distributing total torque of the two motors of the electric vehicle under various driving conditions by using an adaptive dynamic programming method to obtain an efficiency MAP database of a dual-motor high-efficiency operating area of the electric vehicle;

S3. obtaining data information of the electric vehicle under a real-time driving condition, and conducting online learning on the execution network and the evaluation network based on the obtained real-time data information of the electric vehicle to find an optimal control law of the electric vehicle under the real-time driving condition, and optimize the dual-motor control on the electric vehicle.

Preferably, the data information corresponding to the two motors of the electric vehicle under various driving conditions in S1 are obtained by a torque sensor, a rotational speed sensor, a voltage sensor, and a current sensor.

Preferably, the total torque $T_e$ required by the two motors of the electric vehicle in S2 can be expressed by the following formula:

$$T_e = T'_e + T''_e \qquad (1), \text{wherein}$$

$T'_e$ denotes total output torque of the motors of the electric vehicle under a current operating condition, and $T'_e = F/k$, wherein F denotes driving force required by the electric vehicle under the current operating condition, and k denotes efficiency during kinetic energy transmission; $T''_e$ denotes torque that is calculated from the opening and closing of the accelerator pedal of the electric vehicle, and $T''_e = A*T_e\max$, wherein A denotes an accelerator pedal opening of the electric vehicle per unit time, and $T_e\max$ denotes maximum torque of the two motors; and $F = F_{roll} + F_{air} + F_{accel} + F_{grad}$, wherein $F_{roll}$ denotes rolling resistance of the electric vehicle, $F_{air}$ denotes air resistance when the electric vehicle is driving, $F_{accel}$ denotes acceleration resistance when the electric vehicle accelerates, and $F_{grad}$ denotes gradient resistance when the electric vehicle drives uphill.

Preferably, the total torque required by the two motors of the electric vehicle in S2 is further related to vehicle-mounted battery information soc, specifically including:

(1) when 50%≤soc≤100%, $T''_e = A*T_e\max$;
(2) when 30%≤socC<50%, $T''_e = 0.6A*T_e\max$;
(3) when soc<30%, $T''_e = 0.3A*T_e\max$.

Preferably, S2 specifically includes:

S21. conducting torque distribution for the two motors based on the total torque that is required by the two motors of the electric vehicle under different driving conditions and calculated in S1, which can be expressed by the following formula:

$$T_e = T_{e1} + T_{e2} \qquad (2), \text{wherein}$$

$T_{e1}$ and $T_{e2}$ denote output torque of the two motors of the electric vehicle, respectively;

S22. establishing the execution network and the evaluation network for the electric vehicle, and conducting offline training on the execution network and the evaluation network based on the data information of the electric vehicle obtained in S1;

S23. establishing a minimum energy consumption function for a high-efficiency operating point of the two motors of the electric vehicle to minimize energy consumption of dual-motor operation of the electric vehicle, thereby obtaining a data set of high-efficiency dual-motor operation of the electric vehicle under different driving conditions, which can be expressed by the following formula:

$$\min AIM = \alpha(P_1 - P_{Te1}) + \beta(P_2 - P_{Te2}) \qquad (3), \text{wherein}$$

$P_1$ and $P_2$ denote drive system output power of the two motors, $P_{Te1}$ and $P_{Te2}$ denote actual output power of the two motors, $\alpha$ and $\beta$ denote weighting coefficients, $\alpha$ and $\beta$ are proportional to rated power of the two motors, and $\alpha + \beta = 1$; and S24. establishing the efficiency MAP database of the dual-motor high-efficiency operating area of the electric vehicle, and generating a controller signal based on the data set of high-efficiency dual-motor operation obtained in S23.

Preferably, the execution network training in S22 can be expressed by the following formula:

$$c_{l+1}(x_k) = \min\{U(x_k, u_k) + J(x_{k+1}, c_l)\} \qquad (4), \text{wherein}$$

$J(x_k, c_l) \geq J(x_k, c_{l+1})$, J denotes a cost function, U denotes a utility function, $x_k$ denotes input of the execution network at a current moment, $x_{k+1}$ denotes input of the execution network at a next moment, $u_k$ denotes output of the execution network at the current moment, $c_l$ denotes a control law at the current moment, and $c_{l+1}$ denotes a control law at the next moment; and the evaluation network training can be expressed by the following formula:

$$J_{l+1}(x_k, c) = U(x_k, u_k) + J_l(x_{k+1}, c) \qquad (5), \text{wherein}$$

$J_{l+1}(x_k, c) \leq J_l(x_{k+1}, c)$, $J_l$ denotes a cost function at the current moment, $J_{l+1}$ denotes an updated cost function, and C denotes a given control law.

Preferably, S3 specifically includes:

S31. obtaining, by the controller, data information of the electric vehicle in real time, and initializing a system control parameter; and S32. inputting the obtained real-time data information into the execution network and the evaluation network, and finding the optimal control law for the electric vehicle by using iteration and online update methods to optimize the dual-motor control on the electric vehicle.

Preferably, S32 specifically includes:

S321. inputting the real-time data information of the electric vehicle into the execution network to obtain optimal torque distribution of the two motors, and calculating differences $\Delta T_{e1}$ and $\Delta T_{e2}$ between optimal output torque of the two motors and actual output torque of the two motors at the current moment, wherein the real-time data information comprises torque $T_e$, motor efficiency map, rotational speed n, vehicle-mounted battery information soc, difference $\Delta T_e$ between current torque and target torque, difference $\Delta n$ between a current rotational speed and a target rotational speed, difference $\Delta soc$ between current vehicle-mounted battery information and target vehicle-mounted battery information, and $\Delta T_e(t-1)$, $\Delta T_e(t-2)$, map(t-1), map(t-2), $\Delta n(t-1)$, $\Delta n(t-2)$, $\Delta soc(t-1)$, and $\Delta soc(t-2)$ that are obtained through delay;

S322. obtaining differences $\Delta T_{e1}(t-1)$, $\Delta T_{e1}(t-2)$, $\Delta T_{e2}(t-1)$, and $\Delta T_{e2}(t-2)$ between optimal output torque and actual output torque of the two motors at moment t−1 and moment t−2 through delay based on differences $\Delta T_{e1}$ and $\Delta T_{e2}$ between optimal output torque of the two motors and actual output torque of the two motors at the current moment that are obtained in S321;

S323. inputting the real-time data information $\Delta T_{e1}$, $\Delta T_{e2}$, $\Delta T_{e1}(t-1)$, $\Delta T_{e1}(t-2)$, $\Delta T_{e2}(t-1)$, $\Delta T_{e2}(t-2)$, map, map(t-1), map(t-2), $\Delta$soc, $\Delta$soc(t-1), and $\Delta$soc(t-2) obtained in S321 and S322 into the evaluation network to obtain a value of cost function $\hat{J}(t)$ of the evaluation network at moment t;

S324. obtaining real-time data information $\Delta T_{e1}(t-3)$, map(t-3), and $\Delta$soc(t-3) at moment t-3 through delay, and inputting the obtained real-time data information $\Delta T_{e1}(t-1)$ $\Delta T_{e1}(t-2)$, $\Delta T_{e1}(t-3)$, $\Delta T_{e2}(t-1)$, $\Delta T_{e2}(t-2)$, map(t-1), map(t-2), map(t-3), $\Delta$soc(t-1), $\Delta$soc(t-2), and $\Delta$soc(t-3) into evaluation network to obtain a value of cost function $\hat{J}(t-1)$ of the evaluation network at moment t-1;

S325. updating weights of the evaluation network and the execution network based on the results obtained in the foregoing steps; and S326. repeating S321 to S325 until the optimal cost function and the optimal control law are found.

Preferably, an equation for updating the weight of the evaluation network in S325 can be expressed as follows:

$$W_c(t+1) = W_c(t) + \Delta W_c(t) \quad (6), \text{wherein}$$

$W_c(t)$ denotes a weight matrix of the evaluation network at moment t, and $\Delta W_c(t)$ denotes a weight change value of the evaluation network from moment t to moment t+1; and equations for updating the weight of the execution network can be expressed as follows:

$$\Delta W_a(t) = -\eta \cdot \frac{\partial J(t)}{\partial u(t)} \cdot \frac{\partial u(t)}{\partial W_a(t)}, \text{ and} \quad (7)$$

$$W_a(t+1) = W_a(t) + \Delta W_a(t), \quad (8)$$

where $W_a$ denotes a weight matrix of the execution network, $\Delta W_a(t)$ denotes a weight change value of the execution network from moment t to moment t+1, J(t) denotes a cost function at moment t, u(t) denotes output of the execution network at moment t, and $\eta(\eta > 0)$ denotes a learning rate.

Compared with the prior art, the present disclosure aims to optimize dual-motor operating points and dual-motor drive torque distribution by using the adaptive dynamic programming method. In this way, it is ensured that dual-motor operating points of the electric vehicle under various driving conditions deliver the optimal efficiency. In addition, it is ensured that efficiency output of the dual-motor power system of the electric vehicle under different driving conditions is the optimal control law. This resolves the conflict between power and efficiency of the electric vehicle, and improves power performance and efficiency of the dual-motor system of the electric vehicle.

DETAILED DESCRIPTION

To enable a person skilled in the art to better understand technical solutions of the present disclosure, the present disclosure is further described below in detail with reference to the accompanying drawings.

Figure 1:
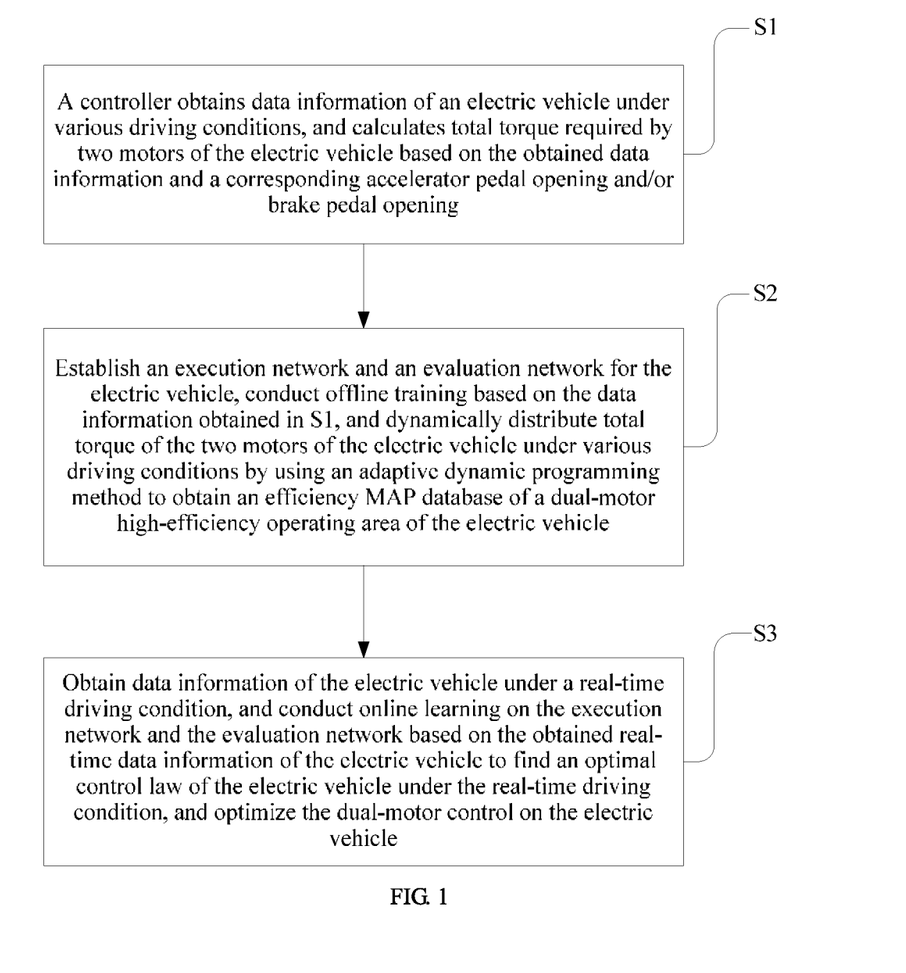
FIG. 1 is a flowchart of a method for dual-motor control on an electric vehicle based on adaptive dynamic programming according to the present disclosure.

As shown in FIG. 1, a method for dual-motor control on an electric vehicle based on adaptive dynamic programming includes the following steps:

S1. A controller obtains data information of the electric vehicle under various driving conditions, and calculates total torque required by two motors of the electric vehicle based on the obtained data information and a corresponding accelerator pedal opening and/or brake pedal opening.

S2. Establish an execution network and an evaluation network for the electric vehicle, conduct offline training based on the data information obtained in S1, and dynamically distribute total torque of the two motors of the electric vehicle under various driving conditions by using an adaptive dynamic programming method to obtain an efficiency MAP database of a dual-motor high-efficiency operating area of the electric vehicle.

S3. Obtain data information of the electric vehicle under a real-time driving condition, and conduct online learning on the execution network and the evaluation network based on the obtained real-time data information of the electric vehicle to find an optimal control law of the electric vehicle under the real-time driving condition, and optimize the dual-motor control on the electric vehicle.

In this embodiment, the controller obtained the data information of the electric vehicle under various driving conditions and calculated the total torque required. Then offline training was conducted on the execution network and the evaluation network based on the obtained data information. In addition, total torque was dynamically distributed for the two motors of the electric vehicle under various driving conditions by using the adaptive dynamic programming method to obtain the efficiency MAP database of the dual-motor high-efficiency operating area of the electric vehicle. Finally, data information of the electric vehicle under different driving conditions was obtained in real time, and iteration and online learning were conducted on the execution network and the evaluation network based on the obtained real-time data information. In this way, the optimal control law of the electric vehicle under the real-time driving condition was found, and the dual-motor control on the electric vehicle was optimized. In this embodiment, dual-motor operating points and dual-motor drive torque distribution were optimized by using the adaptive dynamic programming method. In this way, it was ensured that dual-motor operating points of the electric vehicle under various driving conditions delivered the optimal efficiency. In addition, it was ensured that efficiency output of the dual-motor power system of the electric vehicle under different driving conditions was the optimal control law. This resolved a conflict between power and efficiency of the electric vehicle, and improved power performance and efficiency of the dual-motor system of the electric vehicle.

As shown in FIG. 1, the data information corresponding to the two motors of the electric vehicle under various driving conditions in S1 may be obtained by a torque sensor, a rotational speed sensor, a voltage sensor, and a current sensor. In this embodiment, the torque sensor, the rotational speed sensor, the voltage sensor, and the current sensor may be disposed in the front of and at the back of the electric vehicle to obtain dual-motor data information.

As shown in FIG. 1, the total torque $T_e$ required by the two motors of the electric vehicle in S2 can be expressed by the following formula:

$$T_e = T'_e + T''_e \quad (1).$$

In formula (1), $T'_e$ denotes total output torque of the motors of the electric vehicle under a current operating condition, and $T'_e = F/k$, wherein F denotes driving force required by the electric vehicle under the current operating condition, and k denotes efficiency during kinetic energy transmission; $T''_e$ denotes torque that is calculated from the opening and closing of the accelerator pedal of the electric vehicle, and $T''_e = A*T_e\text{max}$, wherein A denotes an accelerator pedal opening of the electric vehicle per unit time, and $T_e\text{max}$ denotes maximum torque of the two motors; and $F = F_{roll} + F_{air} + F_{accel} + F_{grad}$, wherein $F_{roll}$ denotes rolling resistance of the electric vehicle, $F_{air}$ denotes air resistance when the electric vehicle is driving, $F_{accel}$ denotes acceleration resistance when the electric vehicle accelerates, and $F_{grad}$ denotes gradient resistance when the electric vehicle drives uphill.

In this embodiment, when the driving force and total torque were analyzed and calculated based on the accelerator pedal opening or brake pedal opening, the current vehicle attitude and operating condition needed to be determined by the sensors first, and then the total torque required by the electric vehicle was calculated based on the actual situation and the amount of loss. This was because there were rolling resistance, air resistance, acceleration resistance, and gradient resistance during uphill driving when the electric vehicle was driving, and there was a corresponding loss k during kinetic energy transmission.

As shown in FIG. 1, the total torque required by the two motors of the electric vehicle in S2 may be further related to vehicle-mounted battery information soc, specifically including the following:

(1) when 50%≤soc≤100%, $T''_e = A*T_e\text{max}$;
(2) when 30%≤soc<50%, $T''_e = 0.6A*T_e\text{max}$;
(3) when soc<30%, $T''_e = 0.3A*T_e\text{max}$.

In this embodiment, since a pedal instruction may be closely related to the vehicle-mounted battery information soc, torque that is calculated from the opening and closing of the accelerator pedal of the electric vehicle in cases of different vehicle-mounted battery information soc may be optimized, analyzed, and calculated to obtain more accurate total torque required.

Figure 2:
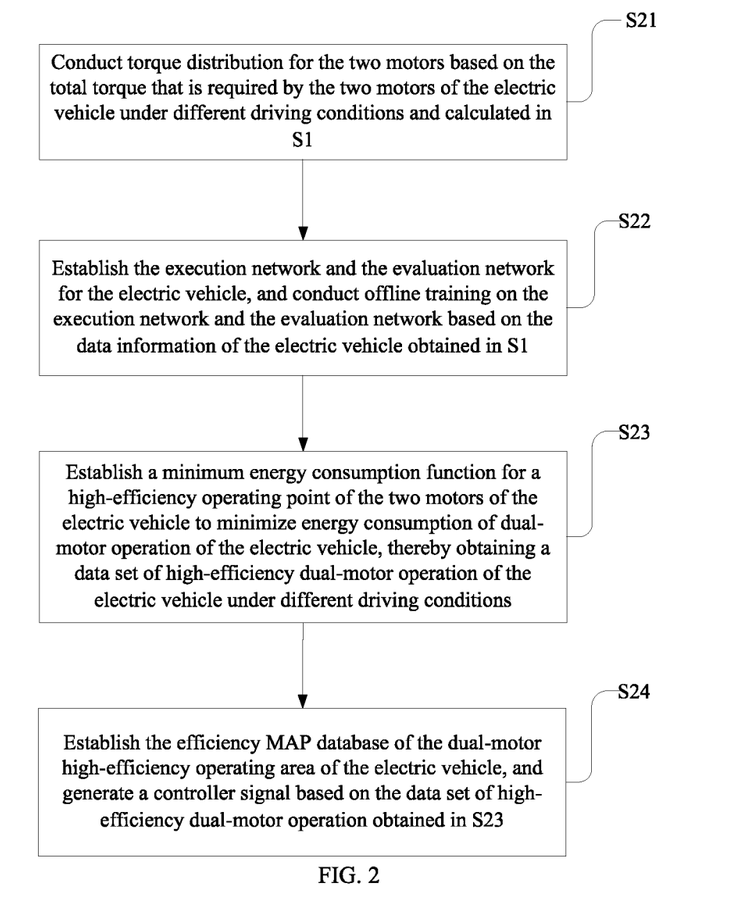
FIG. 2 is a flowchart of a method for obtaining an efficiency MAP database of a dual-motor high-efficiency operating area of an electric vehicle according to the present disclosure.

As shown in FIG. 2, S2 may specifically include the following:

S21. Conduct torque distribution for the two motors based on the total torque that is required by the two motors of the electric vehicle under different driving conditions and calculated in S1, which can be expressed by the following formula:

$$T_e = T_{e1} + T_{e2} \quad (2).$$

In formula (2), $T_{e1}$ and $T_{e2}$ denote output torque of the two motors of the electric vehicle (to be specific, $T_{e1}$ denotes the output torque of one motor of the electric vehicle, and $T_{e2}$ denotes the output torque of the other motor of the electric vehicle).

S22. Establish the execution network and the evaluation network for the electric vehicle, and conduct offline training on the execution network and the evaluation network based on the data information of the electric vehicle obtained in S1.

S23. Establish a minimum energy consumption function for a high-efficiency operating point of the two motors of the electric vehicle to minimize energy consumption of dual-motor operation of the electric vehicle, thereby obtaining a data set of high-efficiency dual-motor operation of the electric vehicle under different driving conditions, which can be expressed by the following formula:

$$\text{minAIM} = \alpha(P_1 - P_{Te1}) + \beta(P_2 - P_{Te2}) \quad (3).$$

In formula (3), $P_1$ and $P_2$ denote drive system output power of the two motors, $P_{Te1}$ and $P_{Te2}$ denote actual output power of the two motors, $\alpha$ and $\beta$ denote weighting coefficients, $\alpha$ and $\beta$ are proportional to rated power of the two motors, and $\alpha + \beta = 1$.

S24. Establish the efficiency MAP database of the dual-motor high-efficiency operating area of the electric vehicle, and generate a controller signal based on the data set of high-efficiency dual-motor operation obtained in S23.

In this embodiment, the obtained total torque required by the two motors of the electric vehicle was dynamically distributed by using the adaptive dynamic programming method first. In addition, offline training was conducted on the execution network and the evaluation network to obtain weights of the execution network and the evaluation network. Then the efficiency MAP database, which included the rotational speed and torque, of the dual-motor high-efficiency operating area of the electric vehicle was established with the objective of minimizing energy consumption of dual-motor operation of the electric vehicle, and the controller signal was generated.

Figure 5:
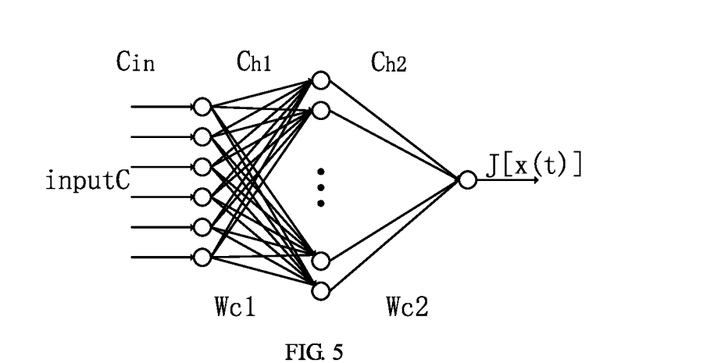
FIG. 5 is a structural diagram of an evaluation network according to the present disclosure.
Figure 6:
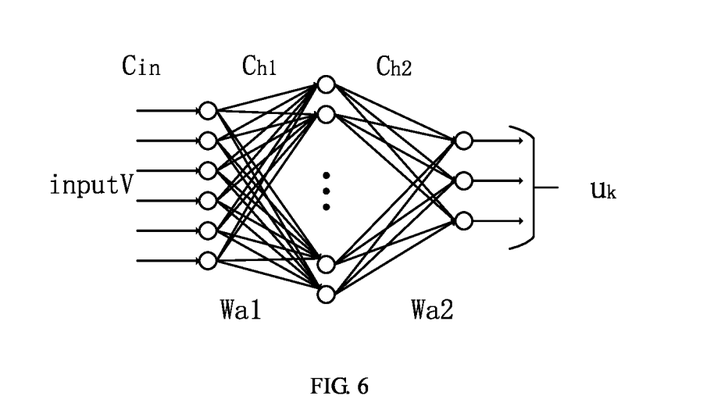
FIG. 6 is a structural diagram of an execution network according to the present disclosure

As shown in FIG. 2, FIG. 5, and FIG. 6, the execution network training in S21 can be expressed by the following formula:

$$c_{l+1}(x_k) = \min\{U(x_k, u_k) + J(x_{k+1}, c_l)\} \quad (4).$$

In formula (4), $J(x_k, c_l) \geq J(x_k, c_{l+1})$, J denotes a cost function, U denotes a utility function, $x_k$ denotes input of the execution network at a current moment, (that is, a state constraint), $x_{k+1}$ denotes input of the execution network at a next moment, (that is, a state constraint), $u_k$ denotes output of the execution network at the current moment, (that is, a state constraint), $c_l$ denotes a control law at the current moment, and $c_{l+1}$ denotes a control law at the next moment.

The evaluation network training can be expressed by the following formula:

$$J_{l+1}(x_k, c) = U(x_k, u_k) + J_l(x_{k+1}, c) \quad (5), \text{wherein}$$

In formula (5), $J_{l+1}(x_k, c) \leq J_l(x_{k+1}, c)$, $J_l$ denotes a cost function at the current moment, $J_{l+1}$ denotes an updated cost function, and c denotes a given control law.

In this embodiment, the execution network aimed to achieve an extreme value of output of the evaluation network. Therefore, the execution network training was determined by the evaluation network, that is, cost function $\hat{J}(t)$ was learned. The input of the execution network can be expressed as:

$$inputV(t) = \begin{bmatrix} T_e, \text{map}, n, \text{soc}, \Delta T_e, \Delta n, \Delta SOC, \Delta T_e(t-1), \Delta T_e(t-2), \text{map}(t-1), \\ \text{map}(t-2), \Delta n(t-1), \Delta n(t-2), \Delta SOC(t-1), \Delta SOC(t-2) \end{bmatrix}$$

$$a_{h1j}(t) = \sum_{i=1}^{15} x_i(t) \cdot W_{a_{h1ij}(t)}$$

$$a_{h2j}(t) = \frac{1 - e^{-a_{h1j}(t)}}{1 + e^{-a_{h1j}(t)}}$$

$$u_j(t) = \sum_{i=1}^{tu} a_{h2j} \cdot W_{a_{2ij}}(t).$$

In the formulas, $a_{h1j}(t)$ denotes input of a jth neuron in the hidden layer of the execution network, $a_{h2j}(t)$ denotes output of the jth neuron in the hidden layer of the execution network, i denotes the number of inputs, $W_{a1}$ denotes a weight matrix from an input layer to the hidden layer of the execution network, and $W_{a2}$ denotes a weight matrix from the hidden layer to the output layer of the execution network.

In this embodiment, a matrix weight may be adjusted by using a gradient descent method during the execution network training to minimize the cost function $\hat{J}(t)$, which may be expressed as $$\Delta W_a(t) = \eta \left[ -\frac{\partial E_c(t)}{\partial W_c(t)} \right] = -\eta \cdot \frac{\partial J(t)}{\partial u(t)} \cdot \frac{\partial u(t)}{\partial W_a}.$$

In formula, u(t) denotes the output of the execution network at moment t, and $\eta(\eta > 0)$ denotes the learning rate. In this embodiment, there are a total of 15 inputs of the execution network.

The output of the evaluation network may be an estimated value of J(t) a performance indicator). The evaluation network training may be implemented by minimizing an error function of the following formula:

$$\|E_c\| = \sum_t \frac{1}{2} \left[ \hat{J}(t) - U(t) - \gamma \hat{J}(t+1) \right]^2.$$

In the formula, $\hat{J}(t) = J[x(t), u(t), t, W_c]$, $W_c$ denotes a parameter of the evaluation network, and the utility function $U(t) = U[x(t), u(t), t]$. For all $t_S$, $$\hat{J}(t) = \sum_{i=t}^{\infty} \gamma^{i-t} U(i)$$

when $E_{c(t)} = 0$, that is, there is no need to substitute $W_c$ into calculation, where $0 < \gamma < 1$. In tracking control design for the two motors of the electric vehicle, a control objective is to minimize the finite sum of U(t) from the current moment to the infinite future, and the utility function $$U(t) = \frac{1}{2} [\Delta T_{e1}^2 + \Delta T_{e2}^2].$$

In this embodiment, the evaluation network and the execution network are both designed as a three-layer feedforward neural network including an input layer, a hidden layer, and an output layer. The input of the evaluation network may be the actual output values ($T_{e1}$ and $T_{e2}$) of the motors, an actual motor operating point MAP, required torque values ($T^*_{e1}$ and $T^*_{e2}$) that are read from the database and that needs to be tracked by the current learning control algorithm, a high-efficiency motor operating area MAP that needs to be tracked (when a motor runs in a constant torque area, a rotational speed of the motor is relatively low, and output torque is relatively large, which meets the requirements of the electric vehicle for fast starting, acceleration, climbing, etc.; when the motor runs in a constant power area, the rotational speed of the motor is relatively high, which meets the requirements of the electric vehicle for high-speed driving, overtaking, etc. on flat roads), the vehicle-mounted battery state SOC, a vehicle-mounted battery status SOC* tracked by the algorithm, and $\Delta T_{e1}(t-1)$, $\Delta T_{e1}(t-2)$, $\Delta T_{e2}(t-1)$, $\Delta T_{e2}(t-2)$, map(t-1), map(t-2), $\Delta$soc(t-1), and $\Delta$soc (t-2) obtained through delay in practice. The evaluation network training includes forward calculation and error back propagation, and during the error back propagation, the weight matrix of the evaluation network is updated by the error feedback.

The forward calculation of the evaluation network may include the following:

The input InputC(t) of the evaluation network can be expressed as $$inputC(t) = \begin{bmatrix} \Delta T_{e1}, \Delta T_{e2}, \Delta T_{e1}(t-1), \Delta T_{e1}(t-2), \Delta T_{e2}(t-1), \Delta T_{e2}(t-2), \Delta SOC \\ \Delta SOC(t-1), \Delta SOC(t-2), \text{map}, \Delta \text{map}(t-1), \Delta \text{map}(t-2) \end{bmatrix}$$

A relationship between the input layer and the hidden layer can be expressed as $$C_{h1j}(t) = \sum_{i=1}^{12} W_{c1ij}(t) \cdot inputC(t).$$

In the formula, $C_{h1j}$ denotes the input of the jth neuron in the hidden layer, $W_{c1}$ denotes the weight matrix from the input layer to the hidden layer of the evaluation network, and $C_{h2j}$ denotes the output of the jth neuron in the hidden layer, and can be expressed as $$C_{h2j} = \frac{1 - e^{-C_{h1j}(t)}}{1 + e^{-C_{h1j}(t)}}.$$

In this case, $$\hat{J}(t) = \sum_{j=1}^{n} C_{h2j}(t) W_{c2j}(t). \, W_{c2}$$

denotes the weight matrix from the hidden layer to the output layer of the evaluation network. In this embodiment, there are a total of 12 inputs of the evaluation network.

In this embodiment, the evaluation network may be trained by using the gradient descent method. A process of updating the weight of the evaluation network may be as follows:

Weight matrix $W_{c2}$ from the hidden layer to the output layer:

$$\Delta W_{c2j}(t) = l_c \left[ -\frac{\partial E_c(t)}{\partial W_{c2j(t)}} \right] = -l_c \cdot e_c(t) \cdot C_{h2j}(t)$$

$$W_{c2}(t+1) = W_{c2}(t) + \Delta W_{c2}(t)$$

Weight matrix $W_{c1}$ from the input layer to the hidden layer:

$$\Delta W_{c1ij}(t) = l_c \left[ -\frac{\partial E_c(t)}{\partial W_{c1ij(t)}} \right] = -\frac{1}{2} l_c \cdot e_c(t) \cdot W_{c2j}(t) \left[ 1 - C_{h2j}^2(t) \right] \cdot inputC(k)$$

$$W_{c1}(t+1) = W_{c2}(t) + \Delta W_{c2}(t)$$

In the formulas, $l_c$ denotes the learning rate, $e_c(t) = \hat{J}(t) - U(t) - \gamma \hat{J}(t+1)$, and $C(k)$ denotes a state vector input at the current moment.

In this embodiment, the hidden layer of the evaluation network adopts a bipolar sigmoidal function, and the output layer adopts a purelin linear function. The gradient descent algorithm (traingdx) is applied to the evaluation network training. In addition, batch processing can also be used to train the evaluation network. In other embodiments, other algorithms such as tradingd, tradingda, tradingdm, and trainlm are also applicable.

Figure 3:
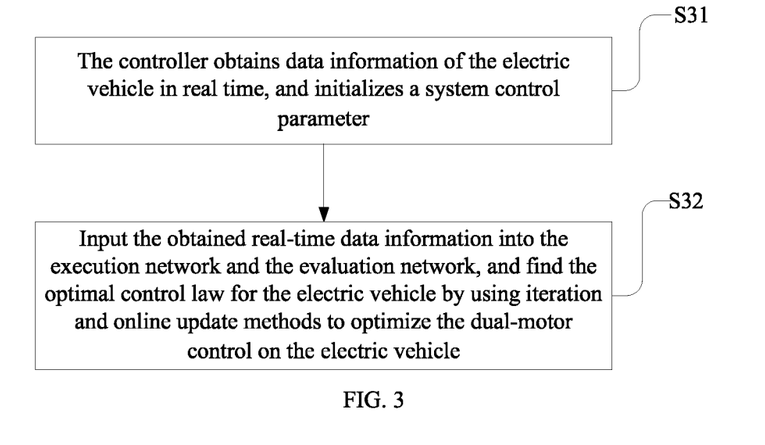
FIG. 3 is a flowchart of a method for obtaining real-time data information of an electric vehicle and using the real-time data information to optimize dual-motor control on the electric vehicle according to the present disclosure.

As shown in FIG. 3, S3 may specifically include the following:

S31. The controller obtains data information of the electric vehicle in real time, and initializes a system control parameter.

S32. Input the obtained real-time data information into the execution network and the evaluation network, and find the optimal control law for the electric vehicle by using iteration and online update methods to optimize the dual-motor control on the electric vehicle.

Figure 4:
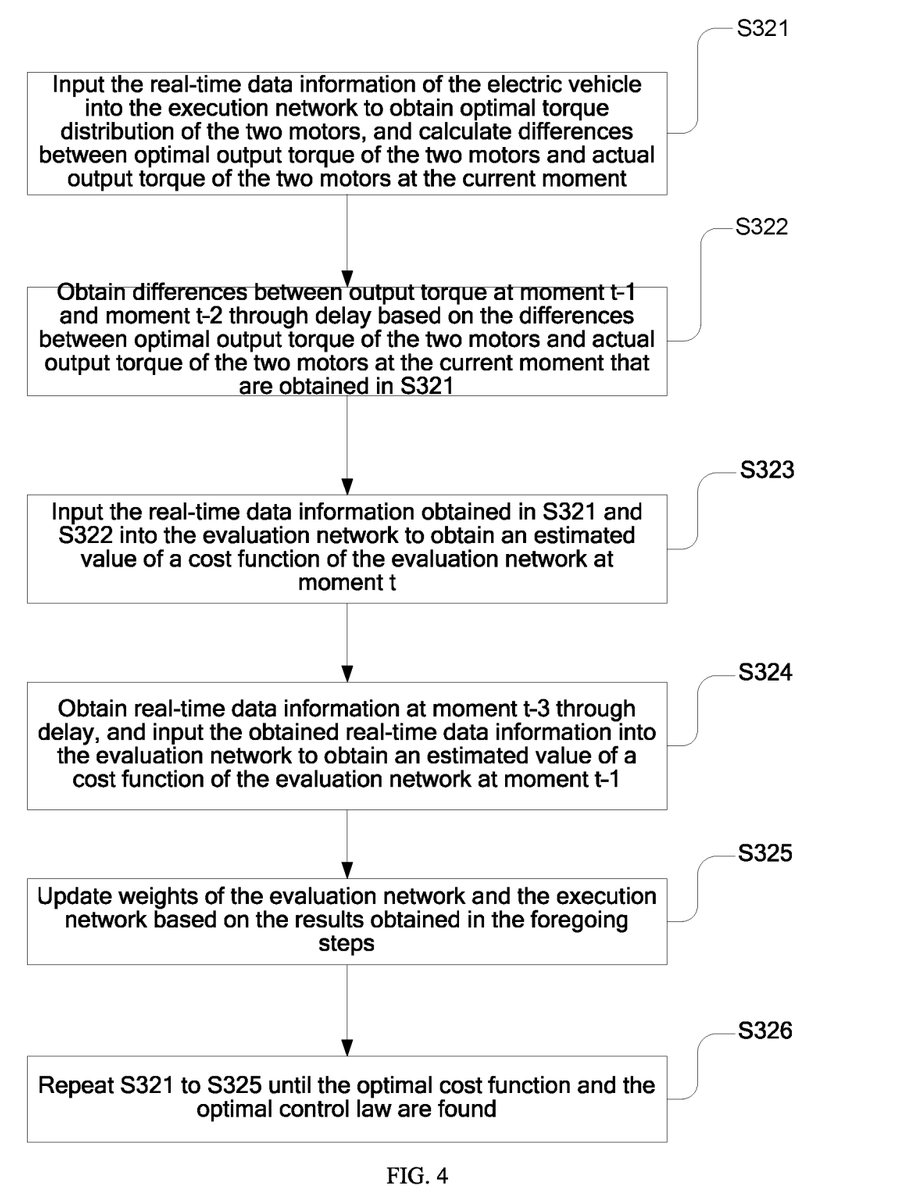
FIG. 4 is a flowchart of a method for inputting real-time data information to a network for online learning and iteration to obtain an optimal control law of an electric vehicle according to the present disclosure.

As shown in FIG. 4, S32 may specifically include the following:

S321. Input the real-time data information of the electric vehicle into the execution network to obtain optimal torque distribution of the two motors, and calculate differences $\Delta T_{e1}$ and $\Delta T_{e2}$ between optimal output torque of the two motors and actual output torque of the two motors at the current moment, where the real-time data information includes torque $T_e$, motor efficiency map, rotational speed n, vehicle-mounted battery information soc, difference $\Delta T_e$ between current torque and target torque, difference $\Delta n$ between a current rotational speed and a target rotational speed, difference $\Delta$soc between current vehicle-mounted battery information and target vehicle-mounted battery information, and $\Delta T_e(t-1)$, $\Delta T_e(t-2)$, map(t-1), map(t-2), $\Delta n(t-1)$, $\Delta n(t-2)$, $\Delta$soc(t-1), and $\Delta$soc(t-2) that are obtained through delay.

S322. Obtain differences $\Delta t_{e1}(t-1)$, $\Delta t_{e1}(t-2)$, $\Delta t_{e2}(t-1)$, and $\Delta t_{e2}(t-2)$, between optimal output torque and actual output torque of the two motors at moment t-1 and moment t-2 through delay based on the obtained differences $\Delta T_{e1}$ and $\Delta T_{e2}$ between optimal output torque of the two motors and actual output torque of the two motors at the current moment.

S323. Input $\Delta T_{e1}$, $\Delta T_{e2}$, $\Delta t_{e1}(t-1)$, $\Delta t_{e1}(t-2)$, $\Delta t_{e2}(t-1)$, $\Delta t_{e2}(t-2)$, map, map(t-1), map(t-2), $\Delta$soc, $\Delta$soc(t-1), and $\Delta$soc(t-2) obtained in S321 and S322 into the evaluation network to obtain a value of cost function $\hat{J}(t)$ of the evaluation network.

S324. Obtain real-time data information $\Delta T_{e1}(t-3)$, map(t-3), and $\Delta$soc(t-3) at moment t-3 through delay, and inputting the obtained real-time data information $\Delta T_{e1}(t-1)$, $\Delta T_{e1}(t-2)$, $\Delta T_{e1}(t-3)$, $\Delta T_{e2}(t-1)$, $\Delta T_{e2}(t-2)$, map(t-1), map(t-2), map(t-3), $\Delta$soc(t-1), $\Delta$soc(t-2), and $\Delta$soc(t-3) into evaluation network to obtain a value of cost function $\hat{J}(t-1)$ of the evaluation network.

S325. Update the weights of the evaluation network and the execution network based on an equation for updating the weight of the evaluation network and an equation for updating the weight of the execution network.

S326. Repeat steps S321 to S325 until the optimal cost function and the optimal control law are found.

In this embodiment, to optimize the dual-motor control on the electric vehicle, the real-time data information obtained by the controller was input to the execution network, and the online learning method was used to continuously optimize performance indicators of the evaluation network, thereby updating the weights of the execution network and the evaluation network. Network selection was conducted to promote rapid convergence of performance indicator functions. Optimal torque distribution for the two motors was rapidly implemented based on a real-time environment change. The optimal control law was output, and real-time online control was optimized. In this way, the two motors of the electric vehicle deliver good performance in dynamic torque distribution, motor response speed, and velocity jump smoothing. In this embodiment, the optimal output torque of the two motors refers to the optimal output torque distribution of the two motors corresponding to the high-efficiency operating area in the MAP database. The target torque refers to the motor torque corresponding to the high-efficiency operating area in the MAP database. The target rotational speed refers to the motor rotation speed corresponding to the high-efficiency operating area in the MAP database. The target vehicle-mounted battery information refers to the vehicle-mounted battery corresponding to the high-efficiency operating area in the MAP database. The real-time data information refers to the data information of the electric vehicle at the current moment.

As shown in FIG. 4, the equation for updating the weight of the evaluation network in S325 can be expressed as follows:

$$W_c(t+1) = W_c(t) + \Delta W_c(t) \qquad (6), \text{wherein}$$

In equation (6), $W_c(t)$ denotes the weight matrix of the evaluation network at moment t, and $\Delta W_c(t)$ denotes a weight change value of the evaluation network from moment t to moment t+1.

Equations for updating the weight of the execution network can be expressed as follows:

$$\Delta W_a(t) = -\eta \cdot \frac{\partial J(t)}{\partial u(t)} \cdot \frac{\partial u(t)}{\partial W_a}, \text{ and} \qquad (7)$$

$$W_a(t+1) = W_a(t) + \Delta W_a(t). \qquad (8)$$

In formula (7) and formula (8), $W_a$ denotes the weight matrix of the execution network, $\Delta W_a(t)$ denotes a weight change value of the execution network from moment t to moment t+1, J(t) denotes a cost function at moment t, u(t) denotes output of the execution network at moment t, and $\eta(\eta > 0)$ denotes the learning rate.

In this embodiment, the evaluation network may be trained by using the gradient descent method. A process of updating the weight of the evaluation network may include the following:

(1) Update the weight matrix $W_{c2}$ from the hidden layer to the output layer, which can be expressed by the following formula:

In formula (9), $$W_{c2}(t+1) = W_{c2}(t) + \Delta W_{c2}(t). \quad (9)$$

$$\Delta W_{c2j}(t) = l_c\left[-\frac{\partial E_c(t)}{\partial W_{c2j}(t)}\right] = -l_c \cdot e_c(t) \cdot C_{h2j}(t).$$

(2) Update the weight matrix $W_{c1}$ from the input layer to the hidden layer, which can be expressed by the following formula:

In formula (10).

$$W_{c1}(t+1) = W_{c2}(t) + \Delta W_{c1}(t). \quad (10)$$

$$\Delta W_{c1j}(t) = l_c\left[-\frac{\partial E_c(t)}{\partial W_{c1j(t)}}\right] = -\frac{1}{2}l_c \cdot e_c(t) \cdot W_{h2j}(t)\left[1 - C_{h2j}^2(t)\right] \cdot inputC(k).$$

The foregoing describes in detail the method for dual-motor control on an electric vehicle based on adaptive dynamic programming provided in the present disclosure. Several examples are used for illustration of the principles and implementation methods of the present disclosure. The description of the embodiments is used to help understand core principles of the present disclosure. It should be noted that, several improvements and modifications may be made by a person of ordinary skill in the art without departing from the principle of the present disclosure, and these improvements and modifications shall fall within the protection scope of the present disclosure.

The invention claimed is:

1. A method for dual-motor control on an electric vehicle based on adaptive dynamic programming, comprising the following steps:

S1) obtaining, by a controller, data information of the electric vehicle under various driving conditions, and calculating total torque required by two motors of the electric vehicle based on the obtained data information and a corresponding accelerator pedal opening and/or brake pedal opening;

S2) establishing an execution network and an evaluation network for the electric vehicle, conducting offline training based on the data information obtained in S1, and dynamically distributing total torque of the two motors of the electric vehicle under various driving conditions by using an adaptive dynamic programming method to obtain an efficiency MAP database of a dual-motor high-efficiency operating area of the electric vehicle;

S3) obtaining data information of the electric vehicle under a real-time driving condition, and conducting online learning on the execution network and the evaluation network based on the obtained real-time data information of the electric vehicle to find an optimal control law of the electric vehicle under the real-time driving condition, and optimize the dual-motor control on the electric vehicle; wherein the data information corresponding to the two motors of the electric vehicle under various driving conditions in S1 are obtained by a torque sensor, a rotational speed sensor, a voltage sensor, and a current sensor; and wherein the total torque $T_e$ required by the two motors of the electric vehicle in S2 can be expressed by the following formula:

$$T_e = T'_e + T''_e \quad (1), \text{ wherein}$$

$T'_e$ denotes total output torque of the motors of the electric vehicle under a current operating condition, and $T'_e = F/k$, wherein F denotes driving force required by the electric vehicle under the current operating condition, and k denotes efficiency during kinetic energy transmission; $T''_e$ denotes torque that is calculated from the opening and closing of the accelerator pedal of the electric vehicle, and $T''_e = A*T_e\text{max}$, wherein A denotes an accelerator pedal opening of the electric vehicle per unit time, and $T_e\text{max}$ denotes maximum torque of the two motors; and $F = F_{roll} + F_{air} + F_{accel} + F_{grad}$, wherein $F_{roll}$ denotes rolling resistance of the electric vehicle, $F_{air}$ denotes air resistance when the electric vehicle is driving, $F_{accel}$ denotes acceleration resistance when the electric vehicle accelerates, and $F_{grad}$ denotes gradient resistance when the electric vehicle drives uphill.

2. The method for dual-motor control on an electric vehicle based on adaptive dynamic programming according to claim 1, wherein the total torque required by the two motors of the electric vehicle in S2 is further related to vehicle-mounted battery information soc, specifically comprising:

(1) when 50%≤soc≤100%, $T''_e = A*T_e\text{max}$;
(2) when 30%≤soc<50%, $T''_e = 0.6A*T_e\text{max}$;
(3) when soc<30%, $T''_e = 0.3A*T_e\text{max}$.

3. The method for dual-motor control on an electric vehicle based on adaptive dynamic programming according to claim 2, wherein S2 specifically comprises:

S21) conducting torque distribution for the two motors based on the total torque that is required by the two motors of the electric vehicle under different driving conditions and calculated in S1, which can be expressed by the following formula:

$$T_e = T_{e1} + T_{e2} \quad (2), \text{ wherein}$$

$T_{e1}$ and $T_{e2}$ denote output torque of the two motors of the electric vehicle, respectively;

S22) establishing the execution network and the evaluation network for the electric vehicle, and conducting offline training on the execution network and the evaluation network based on the data information of the electric vehicle obtained in S1;

S23) establishing a minimum energy consumption function for a high-efficiency operating point of the two motors of the electric vehicle to minimize energy consumption of dual-motor operation of the electric vehicle, thereby obtaining a data set of high-efficiency dual-motor operation of the electric vehicle under different driving conditions, which can be expressed by the following formula:

$$\text{minAIM} = \alpha(P_1 - P_{Te1}) + \beta(P_2 - P_{Te2}) \quad (3), \text{ wherein}$$

$P_1$ and $P_2$ denote drive system output power of the two motors, $P_{Te1}$ and $P_{Te2}$ denote actual output power of the two motors, $\alpha$ and $\beta$ denote weighting coefficients, $\alpha$ and $\beta$ are proportional to rated power of the two motors, and $\alpha + \beta = 1$; and S24) establishing the efficiency MAP database of the dual-motor high-efficiency operating area of the electric vehicle, and generating a controller signal based on the data set of high-efficiency dual-motor operation obtained in S23.

4. The method for dual-motor control on an electric vehicle based on adaptive dynamic programming according to claim 3, wherein the execution network training in S22 can be expressed by the following formula:

$$c_{l+1}(x_k) = \min\{U(x_k, u_k) + J(x_{k+1}, c_l)\} \quad (4), \text{ wherein}$$

$J(x_k, c_l) \geq J(x_k, c_{l+1})$, J denotes a cost function, U denotes a utility function, $x_k$ denotes input of the execution network at a current moment, $x_{k+1}$ denotes input of the execution network at a next moment, $u_k$ denotes output of the execution network at the current moment, $c_l$ denotes a control law at the current moment, and $c_{l+1}$ denotes a control law at the next moment; and the evaluation network training can be expressed by the following formula:

$$J_{l+1}(x_k, c) = U(x_k, u_k) + J_l(x_{k+1}, c) \quad (5), \text{ wherein}$$

$J_{l+1}(x_k, c) \leq J_l(x_{k+1}, c)$, $J_l$ denotes a cost function at the current moment, $J_{l+1}$ denotes an updated cost function, and c denotes a given control law.

5. The method for dual-motor control on an electric vehicle based on adaptive dynamic programming according to claim 4, wherein S3 specifically comprises:
S31) obtaining, by the controller, data information of the electric vehicle in real time, and initializing a system control parameter; and
S32) inputting the obtained real-time data information into the execution network and the evaluation network, and finding the optimal control law for the electric vehicle by using iteration and online update methods to optimize the dual-motor control on the electric vehicle.

6. The method for dual-motor control on an electric vehicle based on adaptive dynamic programming according to claim 5, wherein S32 specifically comprises:
S321) inputting the real-time data information of the electric vehicle into the execution network to obtain optimal torque distribution of the two motors, and calculating differences $\Delta T_{e1}$ and $\Delta T_{e2}$ between optimal output torque of the two motors and actual output torque of the two motors at the current moment, wherein the real-time data information comprises torque $T_e$, motor efficiency map, rotational speed n, vehicle-mounted battery information soc, difference $\Delta T_e$ between current torque and target torque, difference $\Delta n$ between a current rotational speed and a target rotational speed, difference $\Delta soc$ between current vehicle-mounted battery information and target vehicle-mounted battery information, and $\Delta T_e(t-1)$, $\Delta T_e(t-2)$, map(t-1), map(t-2), $\Delta n(t-1)$, $\Delta n(t-2)$, $\Delta soc(t-1)$, and $\Delta soc(t-2)$ that are obtained through delay;

S322) obtaining differences $\Delta T_{e1}(t-1)$, $\Delta T_{e1}(t-2)$, $\Delta T_{e2}(t-1)$, and $\Delta T_{e2}(t-2)$ between optimal output torque and actual output torque of the two motors at moment t−1 and moment t−2 through delay based on differences $\Delta T_{e1}$ and $\Delta T_{e2}$ between optimal output torque of the two motors and actual output torque of the two motors at the current moment that are obtained in S321;

S323) inputting the real-time data information $\Delta T_{e1}$, $\Delta T_{e2}$, $\Delta T_{e1}(t-1)$, $\Delta T_{e1}(t-2)$, $\Delta T_{e2}(t-1)$, $\Delta T_{e2}(t-2)$, map, map(t-1), map(t-2), $\Delta soc$, $\Delta soc(t-1)$, and $\Delta soc(t-2)$ obtained in S321 and S322 into the evaluation network to obtain a value of cost function $\hat{J}(t)$ of the evaluation network at moment t;

S324) obtaining real-time data information $\Delta T_{e1}(t-3)$, map(t-3), and $\Delta soc(t-3)$ at moment t−3 through delay, and inputting the obtained real-time data information $\Delta T_{e1}(t-1)$ $\Delta T_{e1}(t-2)$, $\Delta T_{e1}(t-3)$, $\Delta T_{e2}(t-1)$, $\Delta T_{e2}(t-2)$, map(t-1), map(t-2), map(t-3), $\Delta soc(t-1)$, $\Delta soc(t-2)$, and $\Delta soc(t-3)$ into evaluation network to obtain a value of cost function $\hat{J}(t-1)$ of the evaluation network at moment t−1;

S325) updating weights of the evaluation network and the execution network based on the results obtained in the foregoing steps; and S326) repeating S321 to S325 until the optimal cost function and the optimal control law are found.

7. The method for dual-motor control on an electric vehicle based on adaptive dynamic programming according to claim 6, wherein an equation for updating the weight of the evaluation network in S325 can be expressed as follows:

$$W_c(t+1) = W_c(t) + \Delta W_c(t) \quad (6), \text{ wherein}$$

$W_c(t)$ denotes a weight matrix of the evaluation network at moment t, and $\Delta W_c(t)$ denotes a weight change value of the evaluation network from moment t to moment t+1; and equations for updating the weight of the execution network can be expressed as follows:

$$\Delta W_a(t) = -\eta \cdot \frac{\partial J(t)}{\partial u(t)} \cdot \frac{\partial u(t)}{\partial W_a(t)}, \text{ and} \quad (7)$$

$$W_a(t+1) = W_a(t) + \Delta W_a(t), \quad (8)$$

wherein
$W_a$ denotes a weight matrix of the execution network, $\Delta W_a(t)$ denotes a weight change value of the execution network from moment t to moment t+1, J(t) denotes a cost function at moment t, u(t) denotes output of the execution network at moment t, and $\eta(\eta>0)$ denotes a learning rate.

* * * * *